United States Patent [19]
Shiao

[11] Patent Number: 5,647,623
[45] Date of Patent: Jul. 15, 1997

[54] TELESCOPIC SHAFT MAGNETIC RETRIEVER

[76] Inventor: Hsuan-Sen Shiao, No. 15-1, Lane 369, Min-Chuan Rd., Taichung City, Taiwan

[21] Appl. No.: 691,145

[22] Filed: Aug. 1, 1996

[51] Int. Cl.⁶ ............................ B25J 15/06; F21V 33/00
[52] U.S. Cl. ..................... 294/65.5; 362/109; 362/120
[58] Field of Search ......................... 294/19.1, 65.5, 294/66.2; 135/66, 75, 910; 362/102, 109, 119, 120, 253

[56] References Cited

U.S. PATENT DOCUMENTS

| | | | |
|---|---|---|---|
| 3,582,638 | 6/1971 | Peters | 294/65.5 X |
| 3,924,115 | 12/1975 | Hampton et al. | 294/65.5 X |
| 5,348,359 | 9/1994 | Boozer | 294/65.5 X |
| 5,381,319 | 1/1995 | Shiao | 294/65.5 X |

*Primary Examiner*—Johnny D. Cherry
*Attorney, Agent, or Firm*—Cushman Darby & Cushman, IP Group of Pillsbury Madison & Sutro, LLP

[57] ABSTRACT

A telescopic shaft magnetic retriever includes a telescopic shaft having a conductive battery holder at a tip thereof, and an insulative and transparent lamp holder adapted to hold a lamp and a magnet for retrieving screws, nuts, tools and other steel parts from inaccessible places. The lamp has a first contact connected electrically to a pole of the battery set and a second contact. The lamp holder allows passage of light emitted from the lamp. The retriever further includes a conductive tubular sleeve which is connected threadedly to the conductive battery holder and the lamp holder and which has an end surface in electrical contact with the second contact of the lamp. The battery set, the conductive battery holder, the conductive tubular sleeve, and the lamp constitute an electric circuit. The lamp is switchable by rotating the tubular sleeve relative to the lamp holder.

3 Claims, 4 Drawing Sheets

TELESCOPIC SHAFT MAGNETIC RETRIEVER

BACKGROUND OF THE INVENTION

1. Field of the Invention

The present invention relates to a magnetic retriever, more particularly to a telescopic shaft magnetic retriever which is convenient to operate.

2. Description of the Related Art

When screws, nuts, tools or other parts are dropped into inaccessible places, a retriever that is provided with a magnet is used to pick them up. Moreover, a magnetic retriever having a built-in lighting device is particularly useful to retrieve things in the dark.

U.S. Pat. No. 5,384,319 discloses a telescopic shaft magnetic retriever (R) (see FIG. 1), which includes a telescopic shaft 1 having a battery holder 3 at a tip thereof to hold an insulative socket 3a and a set of dry battery cells 4 within the insulative socket 3a. A conductive lamp holder 5 is fastened to the battery holder 3 to hold a lamp 6. A spring 7 is mounted inside the lamp holder 5 and presses against the negative pole of the dry battery cells 4. The lamp 6 has a first contact 6a which is connected to the spring 7, and a second contact 6b which is isolated from the spring 7 while in contact with the conductive lamp holder 5. A transparent tube 8 is fastened to the lamp holder 5 to allow passage of light emitted from the lamp 6 and to hold a magnet 9 for retrieving screws, nuts, tools and other steel parts from inaccessible places. The retriever (R) further includes a control rod 2 which is received in a longitudinal passage inside the telescopic shaft 1 and the conductive battery holder 3. When the telescopic shaft 1 is collapsed, the dry battery cells 4 are pushed away from the bottom of the battery holder 3 by the control rod 2 to compress the spring 7. Therefore, the battery holder 3 is insulated from the positive pole of the battery cells 4 and the circuit is opened. At this time, the lamp 6 is deactivated. When the telescopic shaft 1 is extended out for retrieving things, the control rod 2 is released from the battery cells 4, so that the spring 7 pushes the battery cells 4 backwards to contact the bottom of the battery holder 3, thereby turning on the lamp 6. Through the extension of the telescopic shaft, the lamp 6 is activated to generate light by means of the action of the control rod 2 and the spring 7.

The conventional retriever with telescopic shaft is convenient to bring along. However, the operations of the retriever for turning the lamp on and off involve extending and collapsing the telescopic shaft. It is desirable if the lamp is switchable without extending or collapsing the telescopic shaft.

SUMMARY OF THE INVENTION

Therefore, the main object of this invention is to provide a telescopic shaft magnetic retriever which has a built-in lighting device with a lamp that can be easily switched on and off, and which is more convenient to operate.

Accordingly, the telescopic shaft magnetic retriever of the present invention mainly includes a telescopic shaft, an insulative and transparent lamp holder and a conductive tubular sleeve. The telescopic shaft has a conductive battery holder at a tip thereof to hold an insulative socket and a battery set including a predetermined number of battery cells within the insulative socket. The insulative and transparent lamp holder is adapted to hold a lamp and a magnet for retrieving screws, nuts, tools and other steel parts from inaccessible places. The lamp has a first contact which is connected electrically to a pole of the battery set and a second contact. The lamp holder allows passage of light emitted from the lamp. The conductive tubular sleeve is connected threadedly to the conductive battery holder and the lamp holder and has an end surface in electrical contact with the second contact of the lamp. The battery set, the conductive battery holder, the conductive tubular sleeve and the lamp constitute an electric circuit, thereby permitting activation of the lamp. The conductive tubular sleeve is rotatable relative to the lamp holder to move away from the lamp holder, so that the second contact of the lamp is electrically disconnected from the conductive sleeve member to deactivate the lamp.

BRIEF DESCRIPTION OF THE DRAWINGS

Other features and advantages of the present invention will become apparent in the following detailed description of the preferred embodiment with reference to the accompanying drawings, of which:

FIG. 3 is a partially sectional view of the telescopic shaft of FIG. 2 when the lamp has been turned on.

DETAILED DESCRIPTION OF THE PREFERRED EMBODIMENT

Figure 1:
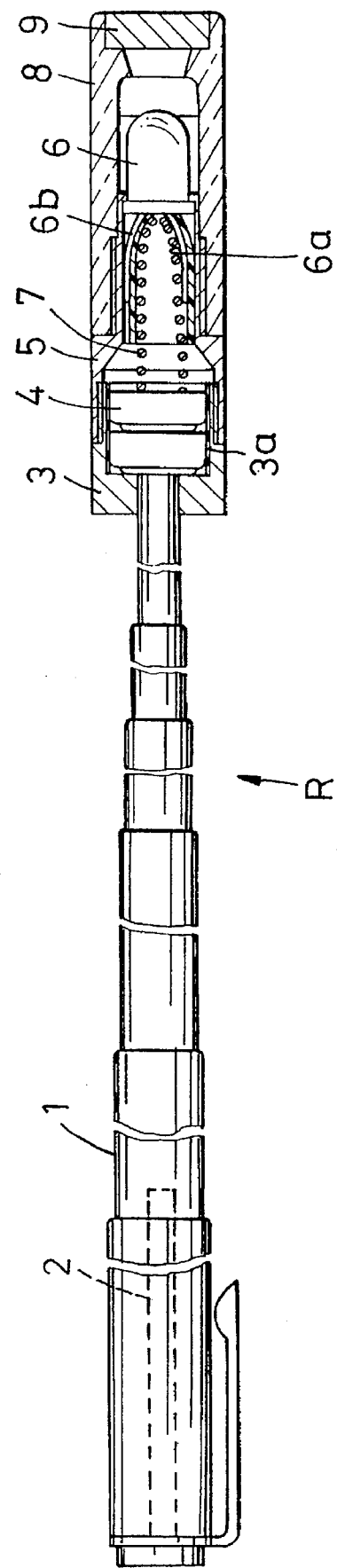
FIG. 1 is a partially sectional view of a conventional telescopic shaft magnetic retriever.
Figure 2:
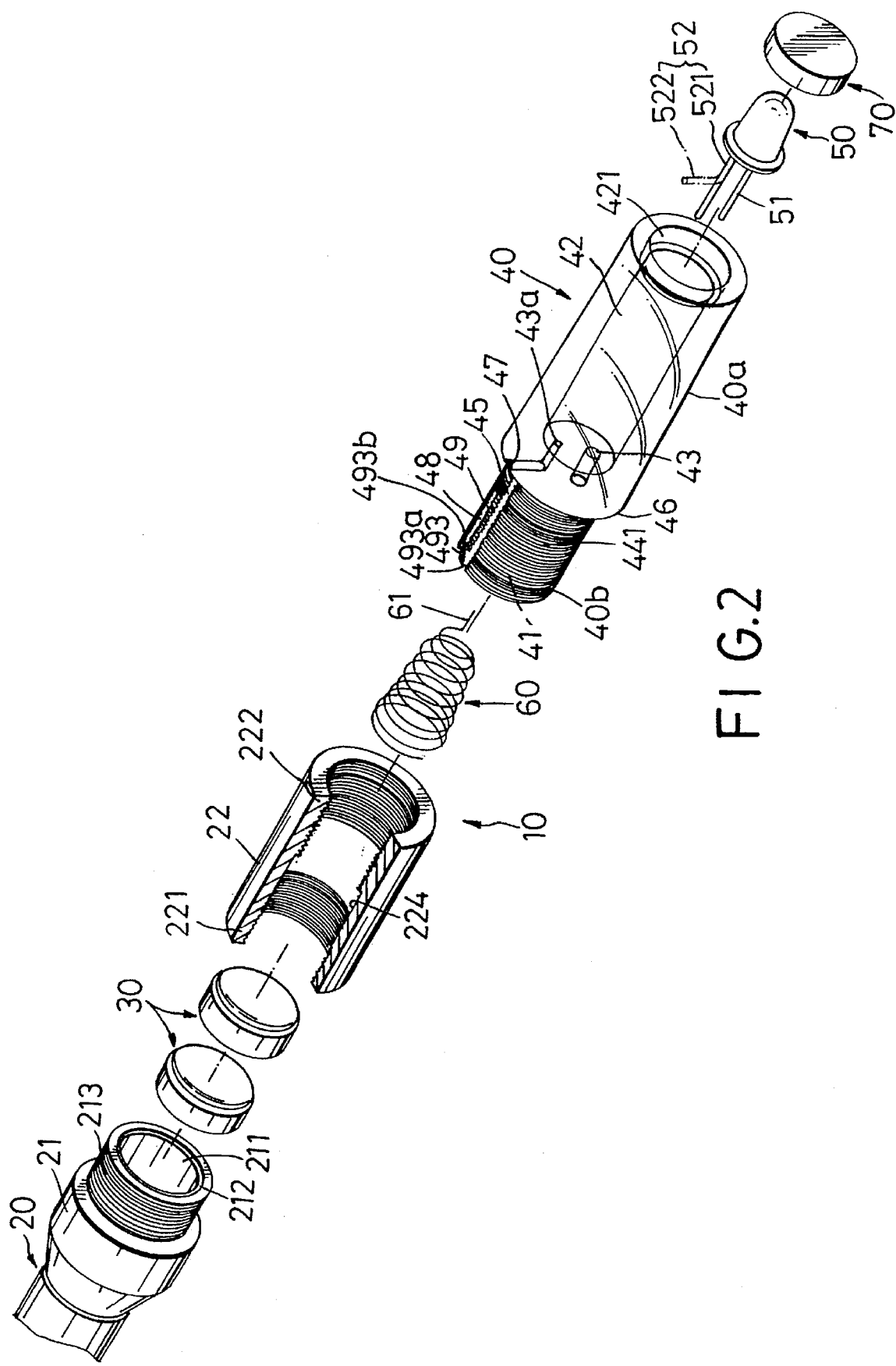
FIG. 2 is a partially exploded schematic view of a preferred embodiment of the telescopic shaft magnetic retriever of the present invention.
Figure 3:
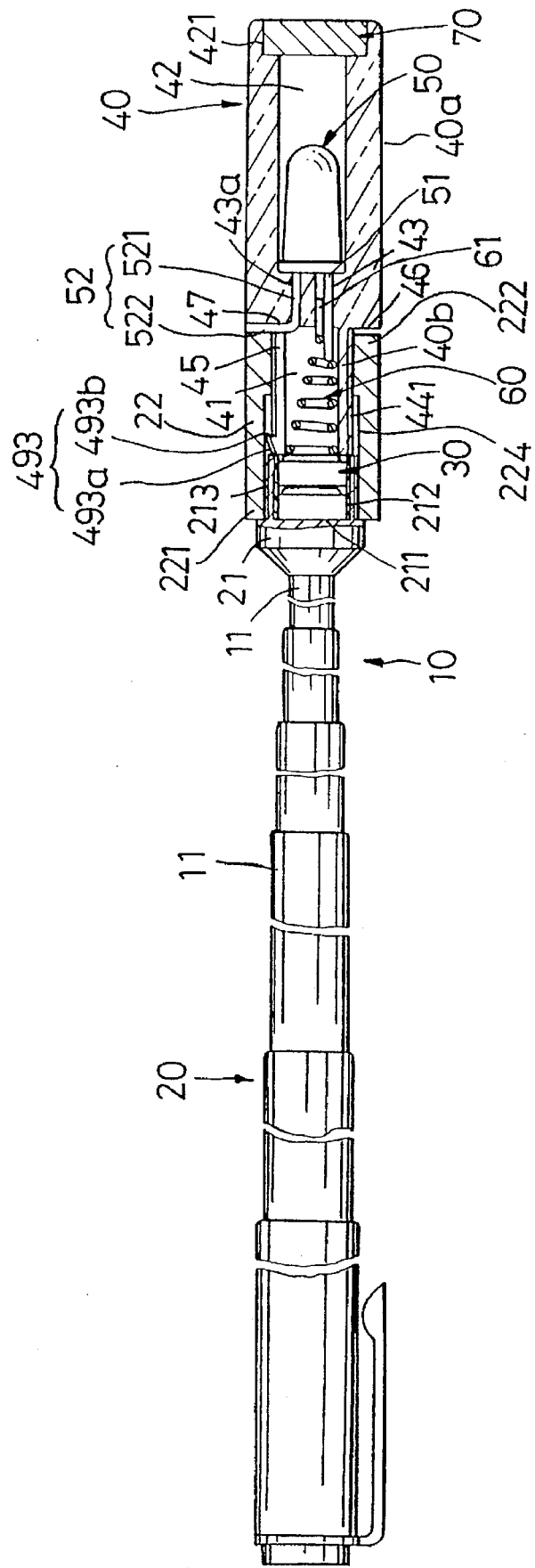

Referring to FIGS. 2 and 3, the telescopic shaft magnetic retriever 10 of the preferred embodiment of the present invention is shown to include a telescopic shaft 20, a set of battery cells 30, a tubular sleeve 22, a spring 60, a lamp holder 40, a lamp 50, and a magnet 70.

The telescopic shaft 20 is composed of a predetermined number of tubes 11 which are sleeved on and coupled to one another. The telescopic shaft 20 is provided with a battery holder 21 at a thinner tip thereof. The battery holder 21, which is made of a conductive metal, has an open end portion 211 which is formed with external screw threads 213 and which is provided with an insulative socket 212 at an inner surface thereof. The battery cells 30 are loaded within the insulative socket 212 in the open end portion 211 of the battery holder 21. The tubular sleeve 22, which is also made of a conductive metal, has internally threaded end portions 221 and 222, and an inner surface formed with an annular groove 224 that has a predetermined axial width.

In this embodiment, the lamp holder 40 is integrally formed from an insulative and transparent material. The lamp holder 40 includes a narrower tubular section 40b having an inner surface which defines a central hole 41, a wider holding body 40a which has an outer diameter larger than that of the tubular section 40b and which has an axial accommodation chamber 42 for accommodating the lamp 50, and a distal end formed with an enlarged hole section 421 which is communicated with the axial accommodation chamber 42, for holding a magnet 70 for retrieving screws, nuts, tools and other steel parts from inaccessible places. Two through holes 43, 43a are formed between and are communicated with the central hole 41 and the axial accommodation chamber 42. The narrower tubular section 40b is formed with external screw threads 441 for engaging the internally threaded end portion 222 of the tubular sleeve 22, and two axial slots 45 and 48 through a wall thereof so as to define an elongated barb member 49 between the two slots 45 and 48. A shoulder 46 is formed between the outer surface of the narrower tubular section 40b and the outer surface of the wider holding body 40a. The shoulder 46 is formed with a radially extending slot 47 which has a generally semi-circular cross-section and which is communicated with the axial slot 45 and the through hole 43a. The barb member 49 is capable of being bent radially and inwardly and has an enlarged and tapered free end portion 493 that engages the annular groove 224 of the tubular sleeve 22. The enlarged and tapered free end portion 493 of the barb member 49 has an inclined outer side surface 493a and a radially extending inner side surface 493b which is transverse to the barb member 49. The inclined outer side surface 493a assists the lamp holder 40 when the latter is being inserted into the tubular sleeve 22 during assembly of the lamp holder 40 and the tubular sleeve 22. The radially extending inner side surface 493b is adapted to be confined within the annular groove 224 in the tubular sleeve 22 and thus prevents removal of the lamp holder 40 from the tubular sleeve 22. The enlarged and tapered free end portion 493 slides axially within the annular groove 224 of the tubular sleeve 22 when the tubular sleeve 22 rotates relative to the lamp holder 40.

In this embodiment, a light emitting diode is used for the lamp 50 which includes a first contact 51 passing through the through hole 43 and extending into the central hole 41 of the lamp holder 40, and a second contact 52 that is bent to form an L-shape and that includes an axial portion 521 and a radial portion 522. The axial portion 521 passes through the through hole 43a and is disposed within the lamp holder 40. The radial portion 522 extends into the radially extending slot 47 in the shoulder 46 and extends partially out of the lamp holder 40 to contact an end surface of the conductive tubular sleeve 22. The depth of the radially extending slot 47 is about one half of the diameter of the second contact 52 of the lamp 50.

The telescopic shaft magnetic retriever 10 of this embodiment further includes a coiled compression spring 60 having an end formed with an axial extension 61 which is inserted into the through hole 43 so as to couple closely with the first contact 51 of the lamp 50 and to help fix the lamp 50 in the accommodation chamber 42 of the lamp holder 40. The other end of the spring 60 abuts against a pole of the battery cells 30. Therefore, the first contact 51 of the lamp 50 is connected electrically to the battery cells 30.

To assemble the telescopic shaft magnetic retriever 10 of this embodiment, the battery cells 30 are loaded in the open end portion 211 of the battery holder 21. The open end portion 211 which is formed with external screw threads is then engaged threadedly with the internally threaded end portion 221 of the tubular sleeve 22. The lamp 50 is then inserted through the enlarged hole section 421 into the accommodation chamber 42 of the lamp holder 40. The first contact 51 and the second contact 52 pass through the through holes 43 and 43a, respectively. The axial extension 61 of the spring 60 is inserted into the through hole 43 to couple closely with the first contact 51 of the lamp 50 and to fix the lamp 50 in the chamber 42. The second contact 52 passes through the through hole 43a and is then bent to form an L-shape, consisting of an axial portion 521 and a radial portion 522. The radial portion 522 of the second contact 52 extends into the radially extending slot 47 in the shoulder 46 of the lamp holder 40 and extends partially out of the lamp holder 40. Finally, the lamp holder 40 and the tubular sleeve 22 are assembled together by threading the tubular section 40b of the lamp holder 40 into the internally threaded end portion 222 of the tubular sleeve 22. Since the barb member 49 is flexible and is capable of being bent radially and inwardly, the enlarged and tapered free end portion 493 rebounds from the internal screw threads of the end portion 222 when the lamp holder 40 is being threaded into the tubular sleeve 22. Moreover, the inclined outer side surface 493a assists the lamp holder 40 when the latter is being inserted into the tubular sleeve 22 during assembly of the lamp holder 40 and the tubular sleeve 22. After the enlarged and tapered free end portion 493 has been located within the annular groove 224 in the tubular sleeve 22, the barb member 49 springs back. Thus, one end of the spring 60 bears against the battery cells 30, and assembly of the magnetic retriever is completed.

When the lamp 50 is turned on, as shown in FIG. 3, the first contact 51 of the lamp 50 is electrically connected with one pole of the battery cells 30 by means of the spring 60. The radial portion 522 of the second contact 52 is electrically connected with the other pole of the battery cells 30 by means of the conductive tubular sleeve 22 and the conductive battery holder 21. The two contacts 51 and 52 of the lamp 50 and the battery cells 30 constitute an electric circuit, thereby permitting activation of the lamp 50. The transparent lamp holder 40 allows passage of light emitted from the lamp 50. With the aid of the magnet 70 and the telescopic shaft 20, the retriever can be used to retrieve things from inaccessible places in the dark.

Figure 4:
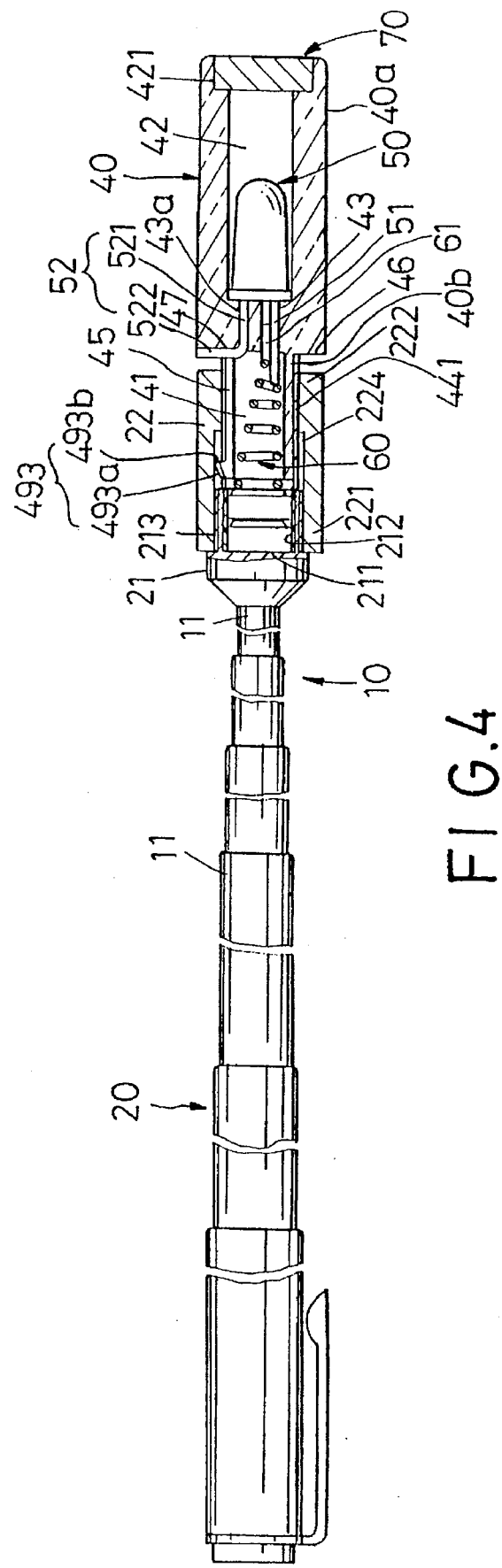
FIG. 4 is a partially sectional view of the telescopic shaft magnetic retriever of FIG. 2 when the lamp has been turned off.

Referring to FIG. 4, to turn the lamp 50 off, the lamp holder 40 is slightly rotated relative to the tubular sleeve 22 to move the tubular section 40b outwardly away from the tubular sleeve 22. Accordingly, the radial portion 522 of the second contact 52 is separated and is electrically disconnected from the end surface of the conductive tubular sleeve 22. Therefore, the lamp 50 is deactivated. In this situation, however, whether or not the lamp 50 is activated, the telescopic shaft 20 can be extended for retrieving things. In other words, the lamp 50 is switchable without extending or collapsing the telescopic shaft 20.

Moreover, when the tubular section 40b is rotated away from the tubular sleeve 22, the radially extending inner side surface 493b of the enlarged and tapered free end portion 493 is capable of being confined within the sleeve 22, thus preventing removal of the transparent lamp holder 40 from the tubular sleeve 22. Therefore, the various components of the magnetic retriever are connected securely to each other.

With this invention thus explained, it is apparent that numerous modifications and variations can be made without departing from the scope and spirit of this invention. It is therefore intended that this invention be limited only as indicated in the appended claims.

I claim:

1. A telescopic shaft magnetic retriever comprising:
    a telescopic shaft having a conductive battery holder at a tip thereof which is adapted to hold an insulative socket and a battery set within said insulative socket;
    an insulative and transparent lamp holder adapted to hold a lamp and a magnet for retrieving screws, nuts, tools and other steel parts from inaccessible places, said lamp having a first contact connected electrically to a pole of said battery set and a second contact, said lamp holder being adapted to allow passage of light emitted from said lamp; and
    a conductive tubular sleeve connected threadedly to said conductive battery holder and said lamp holder and having an end surface in electrical contact with said second contact of said lamp, said battery set, said conductive battery holder, said conductive tubular sleeve, and said lamp constituting an electric circuit, thereby permitting activation of said lamp, said conductive tubular sleeve being rotatable relative to said lamp holder to move away from said lamp holder, so that said second contact of said lamp is electrically disconnected from said conductive sleeve member and that said lamp is deactivated.

2. The telescopic shaft magnetic retriever according to claim 1, wherein said insulative and transparent lamp holder includes a narrower tubular section, a wider holding body having an outer diameter larger than that of said tubular section, and a shoulder formed between outer surfaces of said tubular section and said holding body, said tubular section being formed with external screw threads, said shoulder being formed with a radially extending slot, said tubular sleeve having an internally threaded end portion which engages threadedly said external screw threads of said tubular section of said lamp holder, said second contact of said lamp being bent to form an L-shape and including an axial portion which is disposed within said lamp holder and a radial portion which extends into said radially extending slot in said shoulder and which extends partially out of said transparent lamp holder to contact said conductive tubular sleeve.

3. The telescopic shaft magnetic retriever according to claim 2, wherein said tubular sleeve has an inner surface formed with an annular groove which has a predetermined axial width, said tubular section of said lamp holder being formed with two axial slots through a wall thereof so as to define between said axial slots a barb member which has an enlarged and tapered free end portion that engages said annular groove in said tubular sleeve, said enlarged and tapered free end portion of said barb member having an inclined outer side surface and a radially extending inner side surface, said inclined outer side surface assisting said transparent lamp holder when said lamp holder is being inserted into said tubular sleeve during assembly of said lamp holder and said tubular sleeve, said radially extending inner side surface preventing removal of said transparent lamp holder from said tubular sleeve, said enlarged and tapered free end portion sliding axially within said annular groove of said tubular sleeve when said tubular sleeve rotates relative to said lamp holder.

* * * * *